United States Patent [19]
Burns et al.

[11] 3,883,820
[45] May 13, 1975

[54] GAS LASER HAVING IMPROVED MULTIPLE-PART RESONATOR ADJUSTMENT

[75] Inventors: Edward Samuel Burns, Woodside; Steven James Heising, San Jose, both of Calif.

[73] Assignee: Coherent Radiation, Palo Alto, Calif.

[22] Filed: Apr. 27, 1973

[21] Appl. No.: 355,154

[52] U.S. Cl......... 331/94.5 C; 331/94.5 D; 350/288; 350/310
[51] Int. Cl............................ H01s 3/22; H01s 3/05
[58] Field of Search................... 331/94.5; 330/21.3; 350/288, 310

[56] References Cited
UNITED STATES PATENTS
3,631,319  12/1971  Matthews........................... 315/241
3,696,307  10/1972  Beaulieu et al..................... 331/94.5

OTHER PUBLICATIONS

Matthews, SN 844,092, now Abandoned, referred to in U.S. Patent No. 3,631,319 issued to Matthews on Dec. 28, 1971 in class 315/241, pp. 12-15, FIGS. 1 and 2. Note: Only part of page 12 (lines 18-32) is referenced, and only lines 1-17 of page 15 are referenced.

Primary Examiner—Robert J. Webster
Attorney, Agent, or Firm—Limbach, Limbach & Sutton

[57]  ABSTRACT

A gaseous laser having internal optical resonator mirrors is provided with a multiple-part resonator mirror adjustment.

5 Claims, 4 Drawing Figures

PATENTED MAY 13 1975 3,883,820

GAS LASER HAVING IMPROVED MULTIPLE-PART RESONATOR ADJUSTMENT

BACKGROUND OF THE INVENTION

The present invention relates to lasers and, in particular, to an improved gaseous laser.

Typically, a gaseous laser includes a gas discharge or plasma tube containing the gaseous lasing medium. Within the discharge tube, typically, are one or more anodes, a cathode and a discharge-confining bore tube.

An optical resonator is axially aligned with the region through which the discharge, between the anode and the cathode, passes. The optical resonator includes one mirror or reflector which is totally reflecting and a second mirror or reflector which is sufficiently light transmissive to allow the emergence of an output light beam from the laser.

In some gas lasers the optical resonator is external to the discharge tube. This is typical, for example, of continuous wave noble gas ion lasers. Alternately, the optical resonator mirrors can form a part of the discharge tube envelope itself. In the latter case, the laser is said to have an integral or internal optical resonator.

There are several disadvantages of utilizing external optical resonators. First, since both sides of each resonator are exposed to the atmosphere, dust and other impurities accumulate on the surfaces of the resonator mirrors which internally reflect the laser oscillations. This causes a loss of reflectivity of the mirrors which can seriously limit the output power of the laser.

Secondly, the internally reflected laser light must pass through the atmosphere between the discharge tube and the externally provided laser mirrors. Once again, atmospheric dust can limit the gain of the laser and can also introduce noise into the laser beam.

Third, the internally reflected light has an extra optical medium to pass through, namely, the ends of the discharge tube which typically are fitted with Brewster windows.

In contrast, the reflecting surfaces of the optical resonator mirrors, since they form a part of the discharge tube envelope, are not in contact with the atmosphere and hence do not have the problems listed above which are associated with an external optical resonator.

A problem with lasers having internal resonator mirrors is to insure that the mirrors are properly aligned with each other. In one prior art laser, very precise machining and fabrication is used for aligning the mirrors correctly at the time the laser is assembled, it not being possible to further align the mirrors after the tube is fabricated. In another prior art laser, provision is made to actually bend the entire discharge tube envelope to finely adjust the alignment of the resonator mirrors.

An improved adjustable internal optical resonator is disclosed in pending patent application entitled "Laser Having Improved Adjustable Internal Optical Resonator", Ser. No. 320,146, filed Jan. 2, 1973 by Wayne S. Mefferd and assigned to the assignee of the present invention. There, at least one end of a gaseous laser discharge tube is provided with a cap member forming a part of the discharge tube envelope. The cap member includes a flange and a mirror support plate which are spaced apart and are generally parallel with respect to one another. The two are connected by a tubular member or axle. A central aperture extends throughout the entire length of the cap member.

A resonator mirror is secured to cover the central aperture. A plurality of adjusting screws are provided through peripheral bores along the periphery of the mirror adjustment plate. These screws extend to the flange portion of the cap member. By selectively adjusting these screws to flex the mirror support plate and axle relative to the flange member and the remainder of the discharge tube, fine adjustment of the resonator mirrors is possible.

While the invention has been described in a laser having an internal optical resonator, it should be understood that the multiple-part mirror adjustment of the present invention can also be utilized as an adjustment for a laser using an external resonator.

SUMMARY OF THE INVENTION

It is, therefore, an object of the invention to provide an improved gaseous laser.

Another object of the invention is to provide a laser with an internal optical resonator which is easily adjustable.

Another object of the invention is to provide an adjustable internal optical resonator for a laser which is inexpensively and easily manufactured and assembled.

In accordance with the present invention, a multiple-part mirror support and alignment assembly is provided for a laser having internal optical resonator mirrors.

A hub member having a central aperture is sealed to or otherwise forms a part of the remainder of the gas discharge envelope. The outer circumference of the hub member is threaded. A baseplate and a mirror adjustment plate are screwed on the threaded hub so that they are parallel and spaced apart from each other. The resonator mirror covers the central aperture of the hub member. The mirror adjustment plate is arranged to be situated in proximity with it.

A plurality of bore holes are located through the periphery of the mirror adjustment plate. Adjusting screws extend through the bores to buttingly engage the baseplate. By selectively adjusting these screws to flex the mirror support plate and the hub member relative to the baseplate and the remainder of the discharge tube, fine adjustment of the resonator mirrors is easily made.

Fabrication of the mirror adjustment plate, baseplate, and hub member can be done inexpensively and without difficult and expensive machining. The multiple-part construction also allows easy assembly of each of these parts to form the improved internal resonator adjustment means of the present invention.

DESCRIPTION OF THE PREFERRED EMBODIMENT

Figure 1:
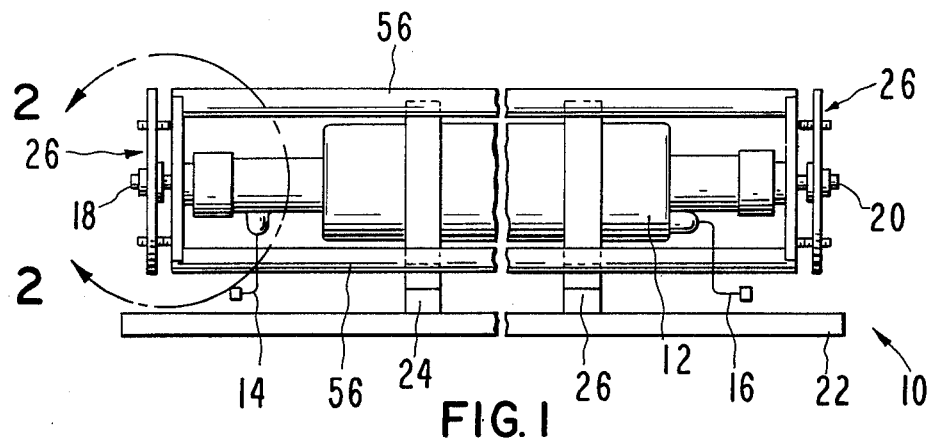
FIG. 1 is an elevational view of a gaseous laser having an internal optical resonator in accordance with the present invention.

A gaseous laser 10 in accordance with the present invention is illustrated in FIG. 1. Laser 10 includes a gas discharge tube or envelope 12 enclosing the gaseous lasing medium. Envelope 12 is made, for example, of pyrex glass. An anode lead 14 and a cathode lead 16 enable a voltage to be applied between an anode and cathode (not shown) within the discharge tube for establishing a discharge within the discharge tube 12 for exciting the gaseous medium as required for lasing action. Since laser discharge tubes are well-known to those skilled in the art and since the discharge tube plays no part in the present invention, no further detail of the discharge tube 12 is given.

A pair of mirrors 18 and 20 form the optical resonator of laser 10. One of these mirrors is substantially totally reflecting and the other is partially light transmissive, it making no difference which mirror is located at which end of tube 12. As will be explained, mirrors 18 and 20 form a part of the discharge tube envelope 12. By this, it is meant that the mirrors 18 and 20 are in direct communication with the gaseous medium of the laser. The discharge tube 12 is mounted to a baseplate 22 by a pair of tube supports 24 and 26.

Figure 2:
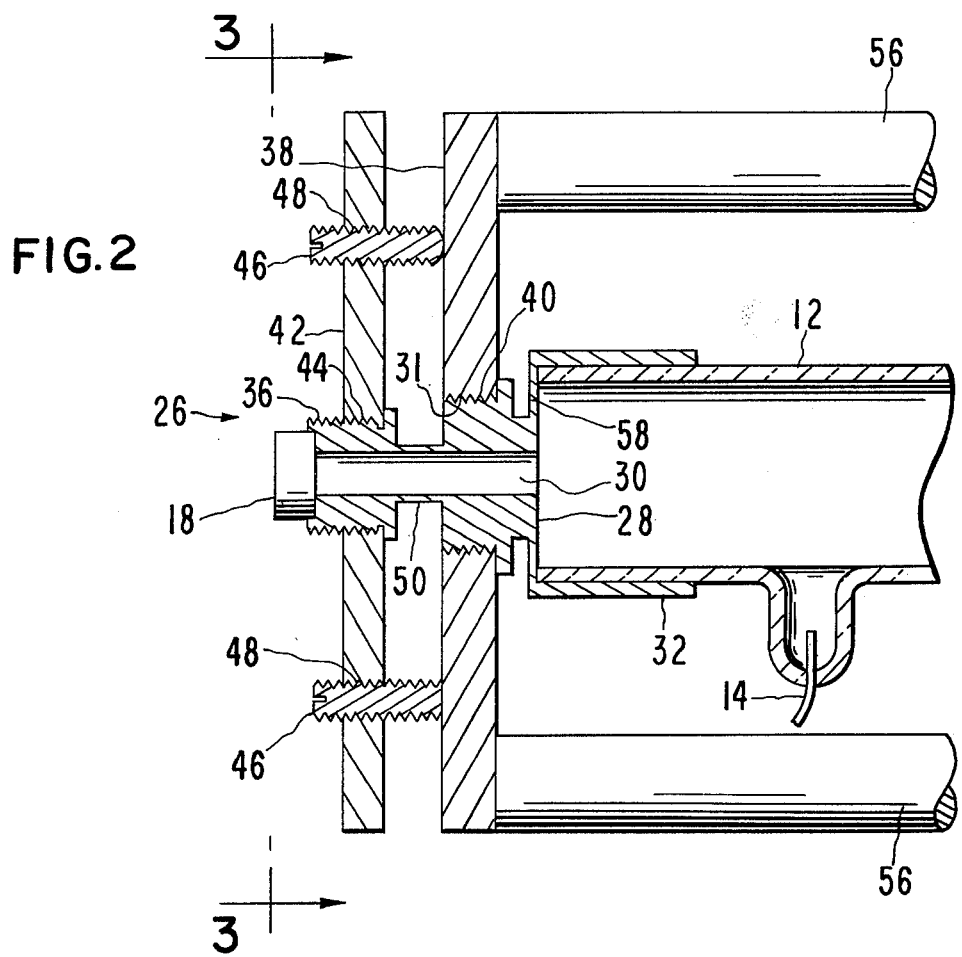
FIG. 2 is an enlarged sectional view of one end of the laser of FIG. 1.
Figure 3:
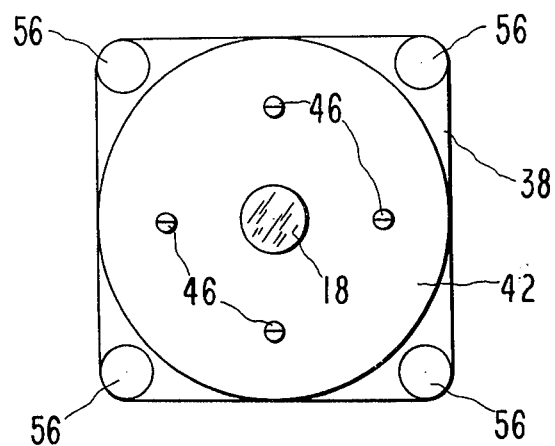
FIG. 3 is an end view of the laser depicted in FIG. 2 taken in the direction indicated by the arrows.

Each of the resonator mirrors 18 and 20 is mounted to a multiple-part mirror support and alignment assembly 26 made, for example, of aluminum. The two assemblies 26 are identical. Thus, further detail of only one of the mirror support and alignment assemblies 26 is shown in FIGS. 2 and 3.

The mirror support and alignment assembly 26 includes a hub member 28 having a central aperture or bore 30 along its axis. One end 32 of hub member 28 surrounds the remainder of the discharge tube 12 and is sealingly attached thereto to form an integral seal with the discharge tube 12.

Hub member 28, in one actual embodiment, is made of aluminum. In one actual embodiment, an epoxy having the tradename "Glasshesive" manufactured by Adhesive Engineering Co., and designated their type no. 2060 is used to seal the end 32 of the hub member 28 to the remainder of the glass discharge tube 12 which is made of pyrex.

The outside surface of the hub member 28 has first and second threaded regions 34 and 36. The diameter of the hub member 32 at the first threaded portion is greater than the diameter of the hub at the second threaded portion 36. This is to more easily enable a baseplate 38 to slip over the second threaded portion 36. The baseplate 38 has a threaded central aperture 40 so that it can be screwed upon the threaded region 34 of the baseplate 38 in the manner shown.

A mirror adjusting plate 42 has a threaded central aperture 44 so that it can be screwed on the second threaded region 36. When screwed on the hub 28, the mirror adjustment plate 42 and baseplate 38 are generally parallel and spaced-apart from each other.

Four adjusting screws 46 extend through peripheral bores 48 provided in the adjustment plate 42 and into butting engagement with the baseplate 38. If laser 10 requires further alignment, one or both of the mirrors 18 and 20 can easily be adjusted by the respective screws 46. When one or more of these screws 46 is rotated, the hub member 28 is flexed at the narrow part 50 thereof and the resonator mirror, which is affixed to the end of the hub member 28 to cover the aperture 30, can be repositioned to the desired alignment. Mirrors 18 and 20 are affixed to the hub member 28 by, for example, an epoxy such as the one referred to above.

Figure 4:
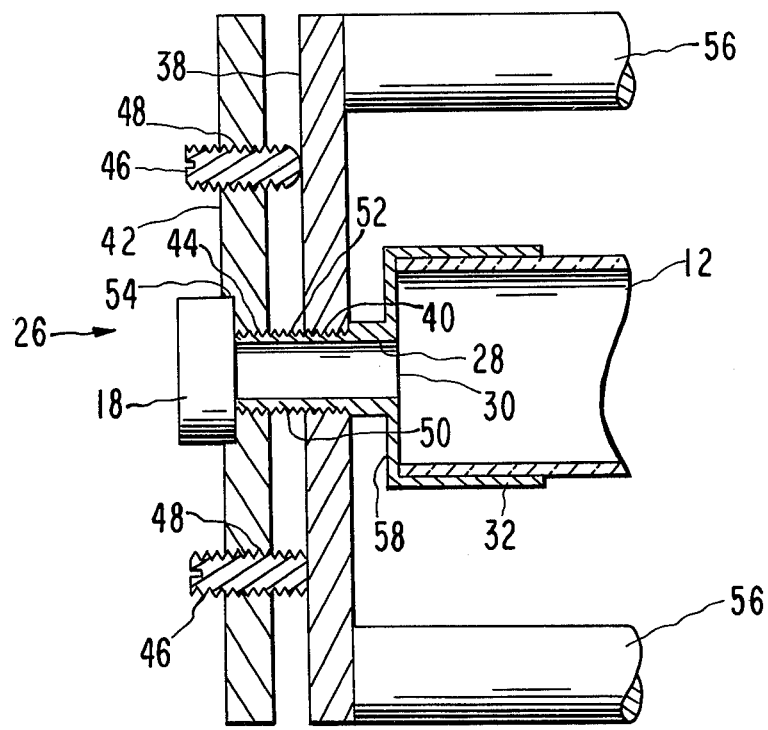
FIG. 4 is an alternate embodiment for the part of the laser depicted in FIG. 3.

An alternate mirror support and alignment assembly embodiment 26' is shown in FIG. 4. Here, the central hub 28 has a single threaded region 52. The threaded central aperture 44 and 40 of the mirror adjusting plate 42 and baseplate 38, respectively, are of the same diameter. Additionally, a recessed well 54 is provided in the outer surface of the mirror support plate 42 and the mirror 18 is fitted within the well 54 and epoxied to cover the central bore 30 of the hub member 28.

To insure a tight and permanent engagement between the mirror support plate and endplate, an epoxy such as the one referred to above can be used to seal the juncture between the threaded areas.

Four stabilizing rods 56 extend longitudinally between the baseplates 30 at opposite ends of laser 10. The stabilizing rods 56 are made of a material such as quartz which has a low coefficient of thermal expansion. The purpose of the rods is to maintain the lateral and angular alignment of the mirrors 18 and 20 despite thermal gradients occurring within the laser 10 during its operation. With the low coefficient of thermal expansion, even great changes in the temperature of the laser 10 will not result in the mirrors 18 and 20 being displaced from their desired aligned positions. Thus, in this manner, additional stabilization and support is given to mirrors 18 and 20 of the internal optical resonator.

As pointed out earlier, the main body of the discharge envelope 12 is made out of a material such as pyrex. Since pyrex has a thermal coefficient of expansion greater than that of the stabilizer rods 56, provision must be made to enable expansion of the discharge envelope 12 relative to the stabilized mirrors 18 and 20.

This is accomplished by means of a thin diaphragm 58 which joins the end tubular portion 42 to the remainder of the hub member 28. Member 58 is sufficiently flexible so that the relative greater expansion due to heat fluctuations of the pyrex envelope 12 relative to the mirror 18 and mirror support 26 absorbs such expansion.

In many laser designs the central passageway of the discharge-confining bore tube is used to define the mode-limiting aperture. Another advantage of the present invention is that the central aperture 30 of the hub member 28 can be utilized for this purpose.

We claim:
1. A gas laser comprising:
   a. envelope means for enclosing the gaseous medium;
   b. means for exciting said gaseous laser medium to provide energy levels therein required for laser action;
   c. a pair of optical resonator mirrors; and
   d. a mirror support and alignment assembly for at least one of said resonator mirrors comprising:
      i. a flexible hub member having a central aperture therethrough axially aligned with the gaseous medium, said hub member having a threaded outside surface;
      ii. means for mounting a resonator mirror to sealingly cover the central aperture of said hub member;
      iii. mirror adjustment and baseplates each having a threaded central aperture for screwed-on engagement with said threaded surface of said hub member so that said plates are parallel and spaced apart from each other, said mirror adjustment plate being situated nearest to said mirror;

iv. said mirror adjustment plate having a plurality of bores located through the periphery thereof; and v. adjusting members extending through each of said peripherally-located bores to buttingly engage said baseplate for flexing said hub member to optically align and adjust said optical resonator mirrors.

2. A laser as in claim 1 wherein said hub member forms an integral part of said envelope means, and wherein said mirror mounted to cover the central aperture of said hub member also forms a part of said envelope means.

3. A gas laser as in claim 1 wherein said hub member has a first threaded region upon which said baseplate is screwed, and a second region upon which said mirror adjustment plate is screwed, and wherein the diameter of the first threaded region and the central aperture of said baseplate are greater than the diameter of said second threaded region.

4. A gas laser as in claim 1 wherein said threaded outside surface comprises a single threaded region and the central apertures of said base and mirror adjustment plates are of the same diameter.

5. A gas laser comprising:
   a. envelope means for enclosing the gaseous medium;
   b. means for exciting said gaseous laser medium to provide energy levels therein required for laser action;
   c. a pair of optical resonator mirrors; and
   d. a mirror support and alignment assembly for at least one of said resonator mirrors comprising:
      i. a flexible hub member having a central aperture therethrough axially aligned with the gaseous medium, said hub member having a threaded outside surface;
      ii. means for mounting a resonator mirror to sealingly cover the central aperture of said hub member;
      iii. mirror adjustment and baseplates each having a threaded central aperture for screwed-on engagement with said threaded surface of said hub member so that said plates are parallel and spaced apart from each other, said mirror adjustment plate being situated nearest to said mirror; and
      iv. means for adjusting the position of said mirror adjustment plate relative to said baseplate by flexing said hub member to optically align said optical resonator mirrors.

* * * * *